US008996181B2

(12) United States Patent
Razum et al.

(10) Patent No.: US 8,996,181 B2
(45) Date of Patent: Mar. 31, 2015

(54) SYSTEMS AND METHODS FOR ANALYZING ENERGY USAGE

(75) Inventors: Joseph Razum, Greenville, SC (US); Richard Henry Langdon, Greenville, SC (US)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 13/084,158

(22) Filed: Apr. 11, 2011

(65) Prior Publication Data

US 2012/0259474 A1 Oct. 11, 2012

(51) Int. Cl.
- G05D 3/12 (2006.01)
- G06F 17/00 (2006.01)
- G06Q 30/00 (2012.01)
- G06E 1/00 (2006.01)
- G01R 21/06 (2006.01)
- G08B 1/08 (2006.01)
- G06Q 50/06 (2012.01)
- G06Q 10/06 (2012.01)

(52) U.S. Cl.
CPC ............... G06Q 50/06 (2013.01); G06Q 10/06 (2013.01)
USPC ............ 700/286; 700/90; 700/291; 700/295; 705/347; 705/400; 706/21; 706/48; 702/61; 340/539.28

(58) Field of Classification Search
CPC .... G06Q 50/06; H02J 2003/143; Y04S 10/54
USPC ............. 700/29, 90, 291, 295, 300; 705/347; 705/400; 706/21, 48; 702/61; 340/60, 340/539.28
See application file for complete search history.

(56) References Cited

U.S. PATENT DOCUMENTS

| | | | |
|---|---|---|---|
| 5,757,322 A * | 5/1998 | Ray et al. | 342/460 |
| 2006/0267783 A1 * | 11/2006 | Smith | 340/601 |
| 2008/0180282 A1 * | 7/2008 | Brosius | 340/995.27 |
| 2010/0042453 A1 * | 2/2010 | Scaramellino et al. | 705/7 |
| 2010/0057641 A1 | 3/2010 | Boss et al. | |
| 2010/0082174 A1 * | 4/2010 | Weaver | 700/295 |
| 2010/0204844 A1 * | 8/2010 | Rettger et al. | 700/291 |
| 2010/0332044 A1 * | 12/2010 | McLean | 700/291 |
| 2011/0046806 A1 * | 2/2011 | Nagel et al. | 700/291 |
| 2011/0137763 A1 * | 6/2011 | Aguilar | 705/30 |
| 2011/0184574 A1 * | 7/2011 | Le Roux et al. | 700/291 |
| 2011/0231028 A1 * | 9/2011 | Ozog | 700/291 |
| 2011/0320054 A1 * | 12/2011 | Brzezowski | 700/291 |
| 2012/0179302 A1 * | 7/2012 | Vadali et al. | 700/291 |
| 2012/0296799 A1 * | 11/2012 | Playfair et al. | 705/37 |

OTHER PUBLICATIONS

Aydinalp et al., "Modelling of residential energy consumption at the national level," Int. J. energy Res. 2003.*
Search Report issued in connection with EP Application No. 12163409.1, Jul. 4, 2012.

* cited by examiner

*Primary Examiner* — Darrin Dunn
(74) *Attorney, Agent, or Firm* — Sutherland Asbill & Brennan LLP

(57) ABSTRACT

Systems and methods for analyzing energy usage are provided. In various embodiments, the systems and methods may receive weather information for a first set of geographical locations and correlate the weather information with energy demand information and economic information to generate one or more models indicating at least one energy usage pattern for a geographical location of interest based at least in part on the correlation of the weather information, the energy demand information, and the economic information.

18 Claims, 4 Drawing Sheets

SYSTEMS AND METHODS FOR ANALYZING ENERGY USAGE

FIELD OF THE INVENTION

Embodiments of the invention relate generally to energy usage, and more particularly, to systems and methods for analyzing energy usage.

BACKGROUND OF THE INVENTION

Demand side management ("DSM") technology is increasing in its use and application for planning, implementing, and monitoring electrical utility activities. DSM technology advantageously analyzes energy demands and associated costs for electrical utilities. Utility providers may utilize the information to more efficiently generate power and/or supply power to the grid according to demand patterns. In addition, consumer-oriented systems (e.g., residential systems) may utilize DSM to more efficiently utilize supplied energy, such as when energy costs are lower, which may be determined based on the DSM models and analysis.

Accordingly, with the increasing use and reliance on DSM technology, there exists a need for improved systems and methods for analyzing energy usage.

SUMMARY OF THE INVENTION

Embodiments of the invention can address some or all of the needs described above. According to one embodiment, a method for recommending energy usage is provided. The method may include: receiving weather information for a first set of geographical locations; receiving energy demand information; and receiving economic information related to energy cost. The method may further include, based at least in part on the weather information, the energy demand information, and the economic information determining at least one of: weather information, energy demand, or economic status, at a geographical location of interest. In addition, the method may include generating at least one energy usage pattern for recommending energy usage behavior for the geographical location of interest.

According to another example embodiment, a system for recommending energy usage is provided. The system may include a memory operable to store instructions and a processor in communication with the memory. The processor may be operable to execute the instructions to: receive weather information for a first set of geographical locations and store the weather information in the memory; receive energy demand information and store the energy demand information in the memory; and receive economic information related to energy cost and store the economic information in the memory. The processor may further be operable to, based at least in part on the weather information, the energy demand information, and the economic information, determine at least one of: weather information, energy demand, or economic status, at a geographical location of interest; and generate at least one energy usage pattern for recommending energy usage behavior for the geographical location of interest.

According to yet another embodiment, a system for recommending energy usage is provided. The system may include a memory operable to store instructions and a processor in communication with the memory. The processor may be operable to execute the instructions to: receive weather information for a first set of geographical locations and correlate the weather information with energy demand information and economic information to generate one or more models indicating at least one energy usage pattern for a geographical location of interest based at least in part on the correlated weather information, energy demand information, and economic information.

Other embodiments and aspects of the invention will become apparent from the following description taken in conjunction with the following drawings.

BRIEF DESCRIPTION OF THE DRAWINGS

Reference will now be made to the accompanying drawings, which are not necessarily drawn to scale, and wherein.

DETAILED DESCRIPTION

Figure 1:
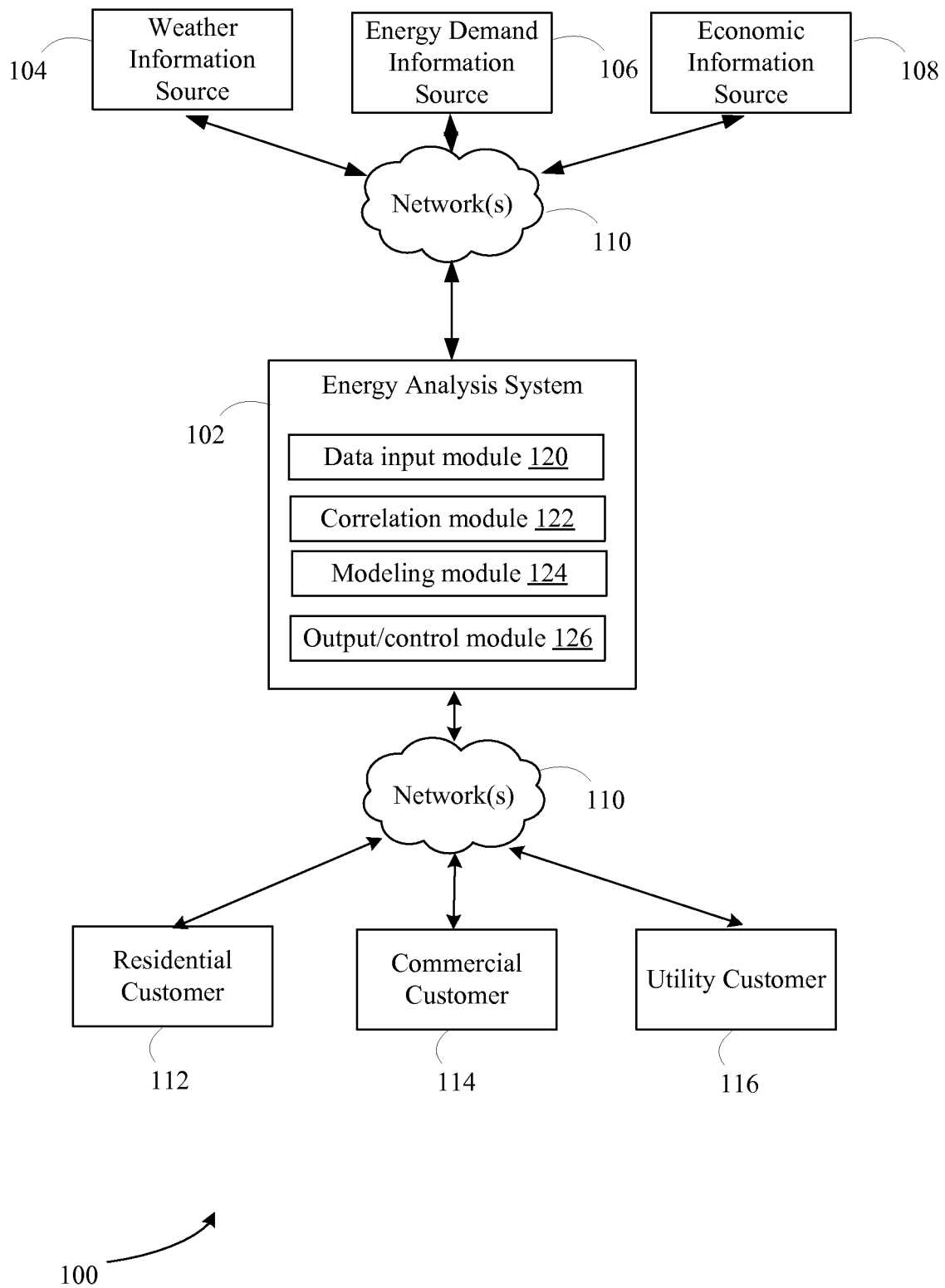
FIG. 1 illustrates an example system for analyzing energy usage, according to an example embodiment.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention can provide systems and methods for analyzing energy usage based at least in part on weather information corresponding to a particular geographical location or locations. Conventional energy demand systems do not incorporate or otherwise consider weather information when generating demand and usage analysis. Weather, however, can play a critical role and can have a significant impact on both the generation of energy and the costs associated therewith, in addition to the utilization of energy and demand generated during certain weather patterns or activity. The analysis may be widely applicable to any type of energy generation and/or usage including, but not limited to, coal, gas, nuclear, wind, and solar energy systems.

According to various embodiments, the energy usage analysis generated can be based on weather information in combination with energy demand information and economic information. As one example, energy demand information may include, but is not limited to, historical energy demand data, real-time or near real-time energy demand data, and/or power outage status, which may be gathered by electrical utilities, third-party monitoring, and/or reporting entities or agencies. Economic information may convey energy pricing information, such as, but not limited to, day ahead energy pricing, periodic energy pricing, and/or real-time or near real-time energy pricing.

The analysis can thus facilitate the generation of energy usage pattern recommendations. By considering weather information in addition to energy demand information and economic information, more specific and tailored energy usage recommendations can be provided. The usage recommendations can be provided to electrical utilities for use in their energy generation and supply analyses, and/or to end users, such as commercial or residential end users, for use in analyzing their energy usage and prescribing more intelligent usage patterns. It is also possible to share or otherwise incorporate the analyses and recommendations for use with energy trading market operations. For example, the analysis may be utilized to better understand or forecast day ahead pricing levels and/or hourly pricing levels. Traders, analysts, and other market participants may subscribe to a service for receiving the analysis, a portion of the analysis, and to optionally supply their own criteria to generate analyses and recommendations.

Embodiments are described more fully below with reference to the accompanying figures, in which embodiments of the invention are shown.

FIG. 1 illustrates an example system for analyzing energy usage, according to one embodiment. The system 100 may include an energy analysis system 102, which is in communication with one or more weather information sources 104, one or more energy demand information sources 106, and one or more economic information sources 108. In addition, the energy analysis system 102 may be in communication with one or more of: residential customer systems 112, commercial customer systems 114, or utility customer systems 116. The energy analysis system 102 may be configured for accessing and reading associated computer-readable media having stored thereon data and/or computer-executable instructions for implementing the various methods described herein. The energy analysis system 102 may be in communication with any one or more of the aforementioned systems and information sources via one or more networks 110, which as described below can include one or more private and public networks, including the Internet. By executing computer-executable instructions, each of these computer systems may form a special purpose computer or a particular machine. As used herein, the term "computer-readable medium" may describe any form of computer memory or memory device.

The energy analysis system 102 may be one or more processor-driven devices, such as, but not limited to, a server computer, a personal computer, a laptop computer, a handheld computer, and the like, an example of which is described in more detail with reference to FIG. 3. According to one embodiment, the energy analysis system 102 may further include, or otherwise be operable with, a data input module 120, a correlation module 122, a modeling module 124, and an output/control module 126. Each of these modules may include or otherwise provide computer-executable instructions operable to implement some or all of the operations and various embodiments described herein, such as the operations described with reference to FIG. 2. The data input module 120, according to one embodiment, may generally be operable to receive, process, and store weather information from the one or more weather information sources 104, receive, process, and store energy demand information from the one or more energy demand information sources 106, and receive, process, and store economic information related to energy costs from the one or more economic information sources 108. The correlation module 122, according to one embodiment, may generally be operable to correlate the various received information relative to one or more geographical locations or nodes of interest. The modeling module 124, according to one embodiment, may generally be operable to generate energy usage pattern data, usage models, energy usage recommendations, and/or system or appliance control profiles, such as are described in more detail herein. The output/control module 126, according to one embodiment, may generally be operable to select and transmit or otherwise present energy usage pattern data, usage models, energy usage recommendations, and/or system or appliance control profiles, as generated by the modeling module 124, to residential customer systems 112, commercial customer systems 114, and/or utility customer systems 116. The output/control module 126, according to one embodiment, may further be operable to receive inquiries or requests for energy usage pattern data, usage models, energy usage recommendations, and/or system or appliance control profiles, such as may be provided by a user interface, as described in more detail with reference to FIG. 4.

The networks 110 may include any number of telecommunication and/or data networks, whether public, private, or a combination thereof, including a local area network, a wide area network, a publicly switched telephone network ("PSTN"), an intranet, the Internet, intermediate handheld data transfer devices, and/or any combination thereof and may be wired and/or wireless. The network 110 may also allow for real-time, off-line, and/or batch transactions to be transmitted between the previously described systems and information sources. Due to network connectivity, various methodologies as described herein may be practiced in the context of distributed computing environments. Although the system 100 is shown for simplicity as including two intervening networks 110, it is to be understood that any other network configuration is possible. For example, the two networks 110 may be the same network, or may each include a plurality of networks, each with respective devices, such as gateways and routers, for providing connectivity between or among the networks 110. Instead of or in addition to a network 110, dedicated communication links may be used to connect the various devices in accordance with an example embodiment of the invention. For example, the energy analysis system 102 may form the basis of the network 110 that interconnects the previously described systems and information sources. Moreover, according to one embodiment, the energy analysis system 102 may form a part of one or more of the residential customer systems 112, the commercial customer systems 114, and/or the utility customer systems 116, and thus a public network may not be required for communication therewith.

Figure 2:
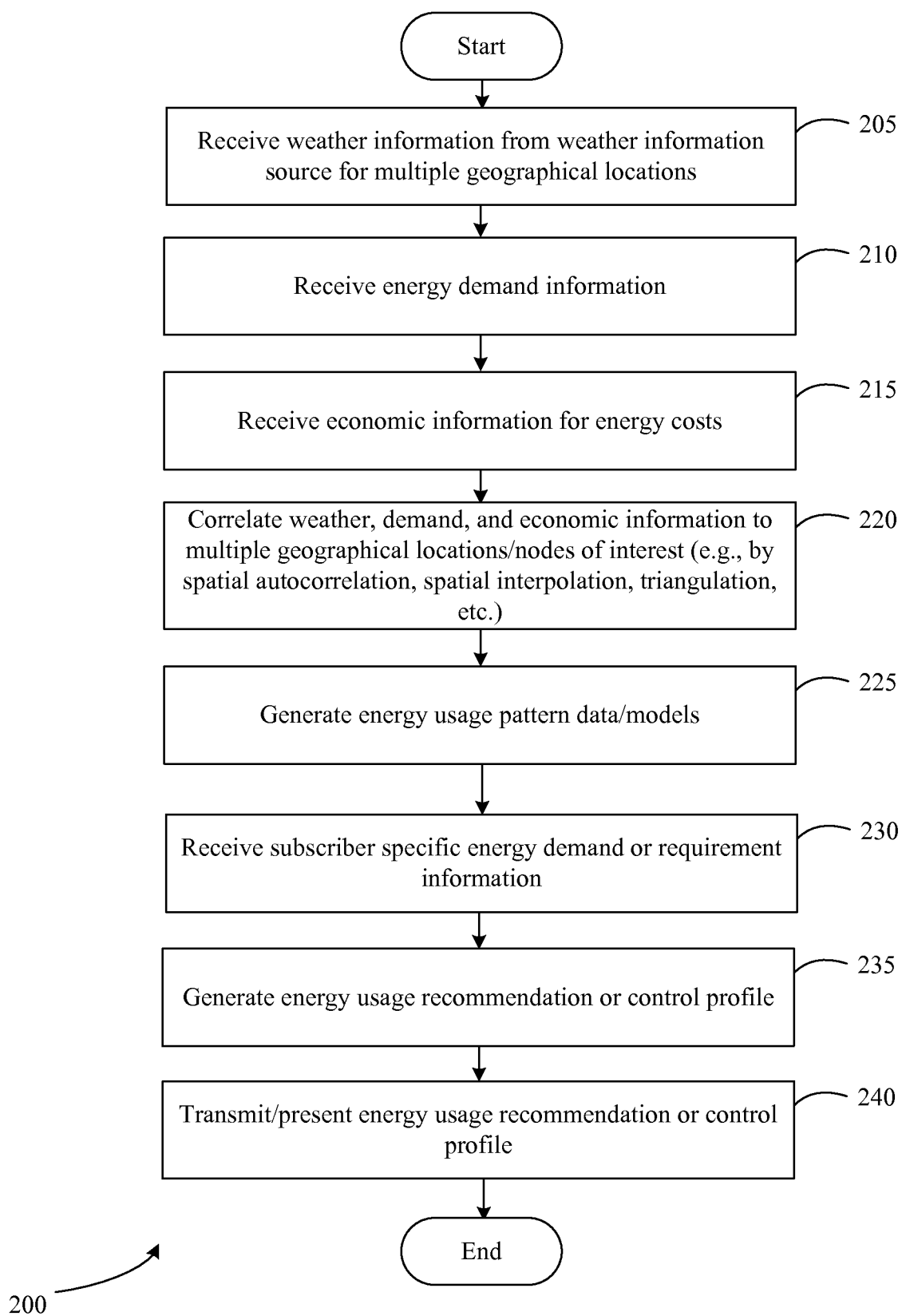
FIG. 2 illustrates an example flow diagram for analyzing energy usage, according to an example embodiment.
Figure 3:
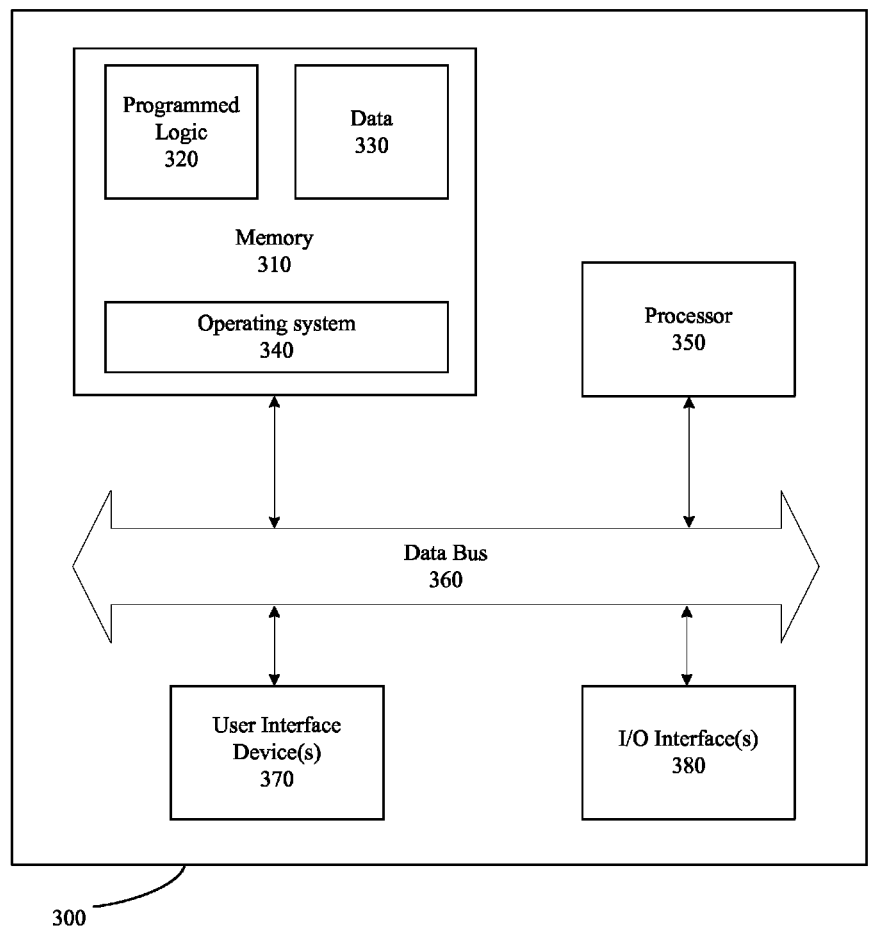
FIG. 3 illustrates an example block diagram of a computer for analyzing energy usage, according to an example embodiment.

FIG. 3 illustrates by way of a block diagram an example computer 300, such as may comprise a part of the energy analysis system 102, and/or any other processor-based systems described herein. More specifically, the computer 300 may include a memory 310 that stores programmed logic 320 (e.g., software, computer-executable instructions, etc.) and may store data 330, such as received weather data, energy demand data, economic and cost data, customer profiles, utility requirements, geographical data, energy usage pattern data, usage models, energy usage recommendations, system or appliance control profiles, user interface templates, standardized data, configurable data, user preferences, and the like. The memory 310 also may include an operating system 340. A processor 350 may utilize the operating system 340 to execute the programmed logic 320, and in doing so, also may utilize the data 330. A data bus 360 may provide communication between the memory 310 and the processor 350. Users may interface with the computer 300 via at least one user interface device 370 such as a keyboard, a mouse, a control panel, or any other devices capable of communicating data to and from the computer 300. The computer 300 may be in communication with any of the information sources and customer systems described herein in real-time or near real-time, as well as via offline or batch communications, via an input/output (I/O) interface 380. More specifically, the computer 300 may carry out the methods described with reference to FIG. 2, including receiving data, correlating data with geographical areas of interest, modeling energy usage and profile information, and facilitating the output or other use of the modeled profiles and usage patterns. Additionally, it should be appreciated that other external systems may be in communication with the computer 300 via the I/O interface 380. The computer 300 may be co-located at or operable with a utility provider, according to one embodiment. However, in other embodiments, the computer 300 may be located remotely or may be operated by a third-party service provider on behalf of a utility provider or other utility customer. Further, the computer 300 and the programmed logic 320 implemented thereby may include software, hardware, firmware, or any combination thereof. It is also appreciated that multiple computers 300 may be used, whereby different features described herein may be executed on one or more different computers 300.

The system 100 shown in and described with respect to FIGS. 1 and 3 is provided by way of example only. Numerous other operating environments, system architectures, and device configurations are possible. Accordingly, embodiments of the invention should not be construed as being limited to any particular operating environment, system architecture, or device configuration.

FIG. 2 illustrates a flow diagram of an example method for analyzing energy usage based at least in part on weather information, energy demand information, and economic cost information, such as may be performed by an energy analysis system described with reference to FIG. 1, according to one embodiment.

The method 200 may begin at block 205, in which the energy analysis system receives weather information for further energy analysis. Weather information sources may include, but are not limited to, international and/or national weather sources (e.g., AccuWeather, etc.), commercial or private weather news sources (e.g., television, radio, Internet, etc.), governmental or non-governmental agencies (e.g., National Oceanic and Atmospheric Administration, National Weather Service, or similar foreign weather services, etc.), research institutions, and the like. For example, a weather news source or other meteorological data gathering entity may periodically transmit weather information to the energy analysis system. Weather information may include, but is not limited to, temperature information, humidity information, wind speed information, wind direction information, cloud cover information, weather trajectory information, seasonal weather patterns, and the like. Weather information may be provided periodically as batch data, such as hourly, a predetermined number of times a day (e.g., twice a day, four times a day, etc.), daily, or according to any other defined schedule. In addition, according to some embodiments, weather information may be provided in real-time or near real-time, such as in response to a request from the energy analysis system. The weather data may include data representing historical weather conditions, current weather conditions, forecasted weather conditions, or any combination thereof.

According to one embodiment, the weather data is provided for multiple geographical locations. Meteorological data may represent weather conditions for each of multiple geographical locations, such as, but not limited to, zip code, latitudinal and longitudinal locations, city center, county, or any other geographical region or location. In some embodiments, the geographical locations may not correlate to the geographical location of interest that the energy analysis system is analyzing and generating energy demand models or usage recommendations. Thus, as described in more detail with reference to block 220, the energy analysis system may correlate weather information for multiple locations to generate an assessment of weather conditions for the geographical locations of interest that are being modeled or for which usage recommendations are being provided. It is appreciated, however, that in some embodiments, the weather information from one source and/or a single set of weather conditions data may be relevant to the entire geographical location of interest and, thus, further correlation is not needed.

Following block 205 is block 210, in which energy demand information may be received by the energy analysis system from one or more energy demand information sources. Energy demand information may include, but is not limited to, historical energy demand data, real-time or near real-time energy demand data, power outage status, energy forecasts, predicted energy surges, etc. Energy demand information sources may include, but are not limited to, electrical utilities, third-party monitoring entities, reporting agencies, research entities, and the like. According to one embodiment, similar to weather information, energy demand information may be specific to a particular geographical location or region. Thus, energy demand information may be gathered from a number of energy demand sources and/or may include data related to a number of geographical locations. Upon receipt, and as part of correlating the received data to facilitate generating energy usage pattern data, the energy analysis system can correlate the energy demand information for multiple locations to generate an assessment of demand related to the geographical locations of interest that are being modeled or for which usage recommendations are being provided. It is appreciated, however, that in some embodiments, the energy demand information from one source and/or a single set of energy demand data may be relevant to the entire geographical location of interest and, thus, further correlation is not needed.

In some embodiments, energy demand information may be specific to a respective customer (e.g., a residential customer, a commercial customer, or a utility), such as if the energy analysis is performed in response to a request from that customer. Customer specific energy demand information may be based on historical energy usage information for that customer, for local and/or for comparable customers, or based on relevant demand trends. In one embodiment, customer specific energy demand information may be obtained directly from the customer, such as from a DSM system that tracks that customer's demand data and intelligently controls that customer's energy usage (or supply if a utility customer). DSM systems may include a smart meter system that stores and/or communicates energy usage data and utilizes demand and supply curves and other analytic processing to intelligently control energy usage or supply.

Following block 210 is block 215, in which economic information may be received by the energy analysis system from one or more economic information sources. Economic information may include, but is not limited to, day ahead energy pricing information, periodic energy pricing information, real-time energy pricing information, or near real-time energy pricing information. According to one embodiment, economic information is received from or otherwise provided by a public entity, such as a state or federal agency (e.g., an Independent System Operator, etc.). However, in other embodiments, the economic information may be obtained from any number of other sources, such as from a utility provider. Pricing information provides an economic component to the energy usage recommendations that can be generated, providing more efficient energy usage by energy customers and more efficient generation by energy suppliers. According to one embodiment, similar to weather information and energy demand information, economic information may be specific to a particular geographical location or region. Thus, economic information may be gathered from a number sources and/or may include data related to energy costs at a number of geographical locations. Upon receipt, and as part of correlating the received data to facilitate generating energy usage pattern data, the energy analysis system can correlate the economic information for multiple locations to generate an assessment of demand related to the geographical locations of interest that are being modeled or for which usage recommendations are being provided. It is appreciated, however, that in some embodiments, the economic information from one source and/or a single set of cost data may be relevant to the entire geographical location of interest and, thus, further correlation is not needed. For example, pricing may be known for a customer based on its utility provider and/or location within the utility topology and correlation from multiple economic information sources may not be required.

Following block 215 is block 220. At block 220, the energy analysis system can initiate a correlation process to correlate the various information data received at blocks 205-215 to a data set representative of the specific geographical area of interest. As mentioned, one or more of the data sets received may not be entirely representative of data for the geographical area of interest for which energy usage models and recommendations are being generated. For example, according to one illustrative embodiment, each of multiple weather data sets may represent different latitudinal and longitudinal pairs (e.g., a first set centered at approximately fifty miles in a first direction from the geographical area of interest, a second set centered at approximately ten miles in a second different direction, and a third set centered at approximately twelve miles in a third direction), while energy demand data and economic data (e.g., day ahead pricing) may be associated with a particular utility grid segment (e.g., specific utility grid sections or regions within the utility grid topology that service the geographical area of interest). Thus, the weather data may not necessarily represent the exact same locations or geographical regions as the demand or pricing data. To resolve this, correlation between the three types of data, each having one or more analyzed data sets, is performed by the energy analysis system.

The different data may be correlated to represent a "node" that is the geographical area of interest for which energy usage models and recommendations are being performed. According to one embodiment, a node may be a latitudinal and longitudinal pair representing the geographical area of interest. For example, the latitudinal and longitudinal pair may represent the center of the area for which the energy usage models and recommendations are being performed. As another example, the latitudinal and longitudinal pair may represent the closest of multiple predetermined areas (which will translate into "nodes") for which energy usage models and recommendations are being performed. As yet another example, the latitudinal and longitudinal pair may represent the location of a customer for whom the energy usage models and recommendations are being performed, such as upon request by the customer (e.g., a residential customer) or when being performed periodically on behalf of the customer (e.g., a commercial customer or utility provider). As another example, the latitudinal and longitudinal pair may represent the location of one or more systems for generating energy or that would otherwise impact the energy generation (or demand) as a result of changing weather conditions, such as when providing information for utility providers to estimate their generation capabilities.

By generating energy usage models and recommendations to nodes that are independent of the utility network or grid topology, the data may be more widely applicable, and the systems may be applied to non-traditional energy networks. For example, nodes that are independent of a utility network or grid topology allow replicating the analysis for multiple different utility networks (e.g., local, national, international, etc.). In addition, nodes that are independent of a utility network or grid topology allow expanding or contracting the scope of the data considered with minimal alteration of the data analysis operations. Accordingly, the correlating operations performed at block 220 on multiple data sets representing multiple different geographical locations allow network independent energy usage models and/or recommendations to be performed.

Correlation may be performed according to any of a number of correlation algorithms. For example, in one embodiment, a spatial analysis may be performed on the multiple data sets, such as, but not limited to, spatial autocorrelation, spatial interpolation, triangulation, and the like. It is appreciated that any number of algorithmic solutions may be performed by the energy analysis system, and that the aforementioned examples are not intended to be limiting. The correlation operations performed at block 220 will generate one or more data sets representing weather conditions, energy demand, and economic pricing, or at least a subset thereof, specific to the particular geographical area of interest.

Following block 220 is block 225, in which energy usage pattern data is generated for the geographical area(s) of interest based on the correlated data sets. According to one embodiment, usage pattern data may consist of one or more models of energy usage for the particular geographical region based at least in part on the correlated weather data, demand data, and economic data. Energy usage models may generally indicate trends and other characteristics that may be utilized by customers and/or by the energy analysis system to generate energy usage recommendations. As an example, energy usage models and/or other pattern data may indicate differences between energy usage, differences between energy demand, and/or differences between energy costs at various times of the day, days of the week, months of the year, and/or any combination thereof. As another example, energy usage models and/or other pattern data may indicate similar differences between different geographical areas of interest, such as may be utilized by a utility provider to facilitate predicting energy demand or by a commercial customer to facilitate making energy usage decisions (e.g., such as if a commercial customer may choose between multiple geographies and/or times to perform certain activities that are high-energy activities, etc.).

Energy usage models may further incorporate output curves, such as may be utilized by a DSM system or by a utility in making energy usage or supply choices, respectively. In addition, the usage pattern data may also or otherwise include one or more transfer functions or other manipulatable equations that mathematically represent energy usage trends and that can output recommendations based on one or more inputs. For example, energy usage transfer functions may be incorporated into a recommendation engine that allows a customer (e.g., a residential customer or a commercial customer) to supply parameters specific to a particular scenario to generate the energy impacts based on the supplied parameters. As discussed further below with reference to FIG. 4, a recommendation engine may be accessed or otherwise combined with a customer inquiry user interface that allows customer-selectable inquiries and that generates usage recommendations based on the correlated weather, demand, and cost data.

Following block 225 is block 230, in which specific energy demand or other energy usage parameters are provided, according to one embodiment. Depending upon the implementation and use of the energy usage pattern data generated at block 225, the parameters may be received by the energy analysis system, or may be supplied to one or more systems co-located or otherwise associated with the subscriber making the request. For example, according to one embodiment, use of the energy usage pattern data is provided by utilities (or third parties) to their residential and/or commercial customers by an energy usage recommendation interface. As briefly mentioned, and described in more detail herein, an interface may be generated that allows inputting specific parameters that are analyzed based at least in part on the energy usage pattern data to generate one or more energy usage recommendations or control profiles. Example parameters may include, but are not limited to, utility rate structure (e.g., pricing/usage agreements, etc.), geographical designation (e.g., zip code, city, state, county, country, latitudinal and longitudinal pair, etc.), usage date or dates (e.g., calendar days, days of week, weeks of year, months, etc.), usage time or times (e.g., hour or hours, morning, afternoon, evening, overnight, etc.), activity type (e.g., activity utilizing the energy, etc.), expected energy usage (e.g., as may be supplied by standardized data sources, as may be determined based on equipment power requirements, etc.), or any other data as desired that may impact energy usage recommendations.

Figure 4:
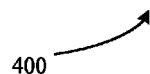
FIG. 4 illustrates an example user interface of a energy recommendation system, according to an example embodiment.

FIG. 4 illustrates an example user interface 400 of an energy usage recommendation system, according to one embodiment. Some or all of the data may be configurable by the energy analysis system, by the utility provider, and/or by the customer, as desired. Some data may be populated based on standardized information, such as expected energy usage estimates. According to one embodiment, the energy recommendation system may be implemented as a thin client or network-based solution, whereby a central system transmits the user interface to, and receives the parameters from, the subscribers (e.g., over the Internet or a private network, etc.). In another embodiment, the energy recommendation system may be provided as a local application, such as if embedded or otherwise operable with a DSM system or utilized by a utility provider to generate energy usage recommendations and/or energy generation schedules. It is appreciated that the user interface, including the sample parameters, are provided for illustrative purposes and is not intended to be limiting. A number of other user interfaces may be generated and provided for use of the energy usage patterns to generate recommendation data.

According to various other embodiments, subscriber's energy demand or requirement inquiries can be supplied according to other techniques, such as, but not limited to, real-time or near real-time data transfer, batch data transfer, verbal inquiry, written inquiry, manual entry. In yet other embodiments, instead of receiving inquiries from one or more subscribers, the energy analysis system may generate reports automatically based on a number of varying parameters, such may be used for widespread distribution or to generate general recommendations that are not customer specific, such as for use with energy trading markets.

Following block 230 is block 235, in which the energy usage recommendation or control profile is generated based on the inquiry or other parameters considered at block 230 and based on the energy usage pattern data and models generated at block 225. As discussed, the energy usage recommendations may take any number of forms including, but not limited to, time of day recommendations, day of week recommendations, time of year recommendations, usage time recommendations, estimated energy used, estimated costs, and/or any combination thereof.

According to another embodiment, instead of, or in addition to, providing energy usage recommendations or estimations, one or more control profiles may be supplied for controlling one or more devices according to the energy usage patterns. For example, control profiles may provide any one or more of the above recommendations, and may further include thresholds (upper and/or lower) associated therewith, which may be utilized by a DSM system for controlling equipment or systems powered by the corresponding energy. Control profiles may be supplied to residential customers and/or to commercial customers to allow more intelligent control of equipment according to more energy efficient control profiles. Control profiles may also be utilized by utility customers, such as for providing recommendations to their customers or to more efficiently control energy generation and/or supply based on the energy usage patterns generated at block 225.

At block 240, the energy usage recommendation or control profile may be transmitted to the recipient. As previously described, the recommendations or control profiles may be transmitted to residential customers, commercial customers, and/or utility providers. The recommendations or control profiles may be presented via an energy recommendation system, such as by the user interface 400 illustrated by FIG. 4, or via any other user interface. In some embodiments, the control profiles may be provided to DSM systems, such as via a system or data update or incorporated therein prior to installation with the customer.

The method 200 may end after block 240, having correlated weather, demand, and economic information received from a number of disparate data sources and generated energy usage recommendations or control profiles based on analytical models and usage patterns generated based on the weather, demand, and economic information.

In other embodiments, the operations performed at blocks 230 through 240 may not be required. For example, according to one embodiment, energy usage pattern data sets, models, and/or transfer functions may be provided to subscribers for analysis independent of the energy analysis system. For example, a utility company may utilize the energy usage pattern data sets and models in a customized fashion, based on independently gathered data (e.g., independent economic data and/or demand data). Similarly, according to another embodiment, the correlated weather data may be supplied to existing DSM systems or other energy demand analysis systems, such that the demand and/or economic data is gathered independent of the energy analysis system described herein.

Accordingly, embodiments of the invention provide systems and methods for analyzing energy usage, which incorporate weather information and its potential effects on energy supply and/or energy usage. Because weather can potentially affect both efficient energy supply and efficient energy usage, a technical effect achieved by these systems and methods allows intelligently including weather data in demand analysis and usage recommendations. A further technical effect achieved by these systems and methods includes an energy recommendation system that generates energy usage recommendations and associated data based on user supplied parameters and the modeled energy usage patterns based on weather data and optionally economic and demand data. Yet an additional technical effect includes the generation of energy demand data that is independent of a utility network topology, other utility provider constraints, or other data source constraints, by correlating the received data (e.g., one or more of weather data, demand data, or economic data) with a network independent node or geographical location of interest.

References are made to block diagrams of systems, methods, apparatuses, and computer program products according to example embodiments of the invention. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc., that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the invention may be embodied in many forms and should not be limited to the example embodiments described above. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for recommending energy usage, comprising:
receiving, by a processor, weather information for a particular geographical region;
identifying, by the processor, a node of interest associated with the particular geographical region;
retrieving, by the processor, spatial data sets associated with the node of interest, the spatial data sets including energy demand information and economic information related to energy cost;
wherein the weather information, the energy demand information, and the economic information are determined by performing a spatial analysis on a subset of the weather information, a subset of the energy information, and a subset of the economic information, and wherein the spatial analysis is performed for multiple locations to assess demand related to the node of interest;
correlating the weather information, the energy demand information, and the economic information for the node of interest to generate one or more data sets representing weather conditions, energy demand, and economic pricing specific to the particular geographic region;
generating one or more energy usage models based on the correlated weather information, energy demand information, and economic information for the node of interest, wherein the one or more energy usage models indicate a pattern of differences between energy usage, energy demand, and an energy cost at a plurality of times for the particular geographical region and one or more of a plurality of geographic locations, the differences being used by a utility provider to predict energy demand for different geographic regions;
using the energy usage model, determining energy usage trends associated with the correlation; and
based on the trends, recommending, by the processor, energy usage behavior for the node of interest to the utility provider to estimate power generation capabilities.

2. The method of claim 1, wherein the particular geographical region of interest includes at least one of a first plurality of geographical locations.

3. The method of claim 1, wherein the particular geographical region of interest is different from a first plurality of geographical locations.

4. The method of claim 3, wherein at least one of: the weather information, the energy demand information, or economic status is determined by triangulating the weather information from at least a subset of a first plurality of geographical locations.

5. The method of claim 1, wherein the energy demand information and the economic information represent a second and a third plurality of geographic locations; and wherein the second and the third plurality of geographic locations are one of: (a) the same as a first plurality of geographic locations; (b) the same as the particular geographic region of interest; or (c) different from a first plurality of geographic locations and the particular geographic region of interest.

6. The method of claim 1, wherein the weather information comprises at least one of: (a) temperature information; (b) humidity information; (c) wind speed information; (d) wind direction information; or (e) cloud cover information.

7. The method of claim 1, wherein the energy demand information comprises at least one of: (a) historical energy demand information; (b) real-time energy demand data; or (c) power outage status.

8. The method of claim 1, wherein the economic information comprises at least one of: (a) day ahead energy pricing; (b) periodic energy pricing; or (c) real-time energy pricing.

9. The method of claim 1, wherein the trends indicate differences in at least one of energy demand or energy cost at a plurality of times for the particular geographic region of interest.

10. The method of claim 1, further comprising:
receiving a subscriber inquiry for an energy usage recommendation comprising at least one of: (a) an energy usage activity, or (b) an energy usage time; and
determining the energy usage recommendation based at least in part on the energy usage behavior and at least one of: (a) the received energy usage activity, or (b) the received energy usage time.

11. The method of claim 10, wherein the energy usage recommendation indicates at least one of: (a) at least one recommended time; (b) an energy cost; (c) desirability of performing the energy usage activity for a plurality of times; or (d) a recommended usage status.

12. The method of claim 10, wherein the subscriber inquiry comprises one of: (a) a residential inquiry received over a network; (b) a utility inquiry received over a network; or (c) a commercial inquiry received over a network.

13. The method of claim 1, further comprising:
generating one or more control profiles for controlling one or more devices according to the energy usage patterns; and
transmitting the one or more control profiles for processing by a demand side management system.

14. A system for recommending energy usage, comprising:
a memory operable to store instructions; and
a processor in communication with the memory and operable to execute the instructions to:
receive weather information for a particular geographical region;
identify a node of interest associated with the particular geographical region;
retrieve spatial data sets associated with the node of interest, the spatial data sets including
energy demand information and
economic information related to energy cost;
wherein the weather information, the energy demand information, and the economic information are determined by performing a spatial analysis on a subset of the weather information, a subset of the energy information, and a subset of the economic information, and wherein the spatial analysis is performed for multiple locations to assess demand related to the node of interest;
correlate the weather information, the energy demand information, and the economic information for the node of interest to generate one or more data sets representing weather conditions, energy demand, and economic pricing specific to the particular geographic region;
generate one or more energy usage models based on the correlated weather information, energy demand information, and economic information for the node of interest, wherein the one or more energy usage models indicate a pattern of differences between energy usage, energy demand, and an energy cost at a plurality of times for the particular geographical region and one or more of a plurality of geographic locations, the differences being used by a utility provider to predict energy demand for different geographic regions;
using the energy usage model, determine energy usage trends associated with the correlation; and
based on the trends, recommend energy usage behavior for the node of interest to the utility provider to estimate power generation capabilities.

15. The system of claim 14, wherein, when determining at least one of: the weather information, the energy demand information, or economic status, the processor is operable to triangulate the weather information from at least a subset of a first plurality of geographical locations.

16. The system of claim 14, wherein the processor is further operable to:
receive a subscriber inquiry for an energy usage recommendation comprising at least one of: (a) an energy usage activity, or (b) an energy usage time; and
determine the energy usage recommendation based at least in part on the energy usage behavior and at least one of: (a) the received energy usage activity, or (b) the received energy usage time.

17. The system of claim 14, wherein the processor is further operable to:
generate one or more control profiles for controlling one or more devices according to the at least one energy usage pattern; and
transmitting the one or more control profiles for processing by a demand side management system.

18. A system for recommending energy usage, comprising:
a memory operable to store instructions; and
a processor in communication with the memory and operable to execute the instructions to:
receive weather information for a particular geographical region;
identify a node of interest associated with the particular geographical region;
correlate the weather information, energy demand information, and economic information for the node of interest to generate one or more data sets representing weather conditions, energy demand, and economic pricing specific to the particular geographic region; and
generate one or more energy usage models based on the correlated weather information, demand information, and economic information for the node of interest, wherein the one or more energy usage models indicate a pattern of differences between energy usage, energy demand, and an energy cost at a plurality of times for the particular geographical region and one or more of a plurality of geographic locations, wherein the differences are used by a utility provider to predict energy demand for different geographic regions, wherein the weather information, the energy demand information, and the economic information are determined by performing a spatial analysis on a subset of the weather information, a subset of the energy information, and a subset of the economic information, and wherein the spatial analysis is performed for multiple locations to assess demand related to the node of interest.

* * * * *

UNITED STATES PATENT AND TRADEMARK OFFICE
CERTIFICATE OF CORRECTION

PATENT NO. : 8,996,181 B2  
APPLICATION NO. : 13/084158  
DATED : March 31, 2015  
INVENTOR(S) : Razum et al.

Page 1 of 1

It is certified that error appears in the above-identified patent and that said Letters Patent is hereby corrected as shown below:

In the Claims

In Column 12, Line 32, in Claim 1, delete "determining" and insert -- to determine --, therefor.

In Column 12, Line 34, in Claim 1, delete "the trends," and insert -- the energy usage trends, --, therefor.

In Column 12, Line 46, in Claim 4, delete "status" and insert -- information --, therefor.

In Column 12, Line 54, in Claim 5, delete "geographic" and insert -- geographical --, therefor.

In Column 12, Line 56, in Claim 5, delete "geographic" and insert -- geographical --, therefor.

In Column 13, Line 1, in Claim 9, delete "the trends" and insert -- the energy usage trends --, therefor.

In Column 13, Line 3, in Claim 9, delete "geographic" and insert -- geographical --, therefor.

In Column 14, Line 6, in Claim 14, delete "the trends," and insert -- the energy usage trends, --, therefor.

In Column 14, Line 10, in Claim 15, delete "status," and insert -- information, --, therefor.

In Column 14, Line 27, in Claim 17, delete "transmitting" and insert -- transmit --, therefor.

Signed and Sealed this  
Fifth Day of April, 2016

Michelle K. Lee  
*Director of the United States Patent and Trademark Office*